3,066,961
SLEEVE COUPLING WITH INTERNAL ELASTIC
RINGS FOR SMOOTH PIPES
Jacques Gerin, Scarsdale, N.Y., assignor to Societe Anonyme Eternit, Kapelle-op-den-Bos, Belgium, a Belgian company
Filed Dec. 12, 1958, Ser. No. 780,134
Claims priority, application Belgium Sept. 12, 1958
1 Claim. (Cl. 285—230)

The invention relates to a sleeve coupling arrangement and to elastic rings for smooth pipes such as pipes made of asbestos cement.

Known couplings of this kind have various disadvantages such as they require very close tolerances, there is difficulty in mounting the elastic packings on the pipes, they require the use of special tools, a relatively long time is required to assemble the coupling, there is the necessity of compressing the elastic rings very strongly in order to obtain the desired sealing-tightness, and there is the difficulty of keeping apart the ends of the two pipes which are connected together by the sleeve.

The coupling according to the invention obviates these disadvantages and is characterized in that the internal grooves of the sleeves and the elastic rings lodged in these grooves are so shaped that, simply by sliding the ends of the pipe to be assembled into the sleeve, the rings are held in the grooves and compressed between the walls of the sleeve and the pipes in order to form a coupling whose sealing-tightness increases with the pressure of the fluid passing through the pipes.

For this purpose, the internal grooves in the sleeve, advantageously arranged near the ends of the said sleeve, comprise a cylindrical bottom, an outer side situated in a plane perpendicular to the axis of the sleeve, and an inner side inclined towards the other end of the sleeve, and the packing rings are so shaped as to fit the shape of the grooves and have a rounded-off portion facilitating the introduction of the pipes which, in their turn, are bevelled externally at their ends.

If desired, the pipe ends engaging in the sleeve can be reduced in diameter to form steps which prevent displacement of the sleeve and also prevent direct contact between the pipes engaged in the sleeve. In this case, the sleeve is advantageously bevelled internally, and abuts against elastic bevelled rings which are slid over the pipes and bear against the steps.

Figure 1:
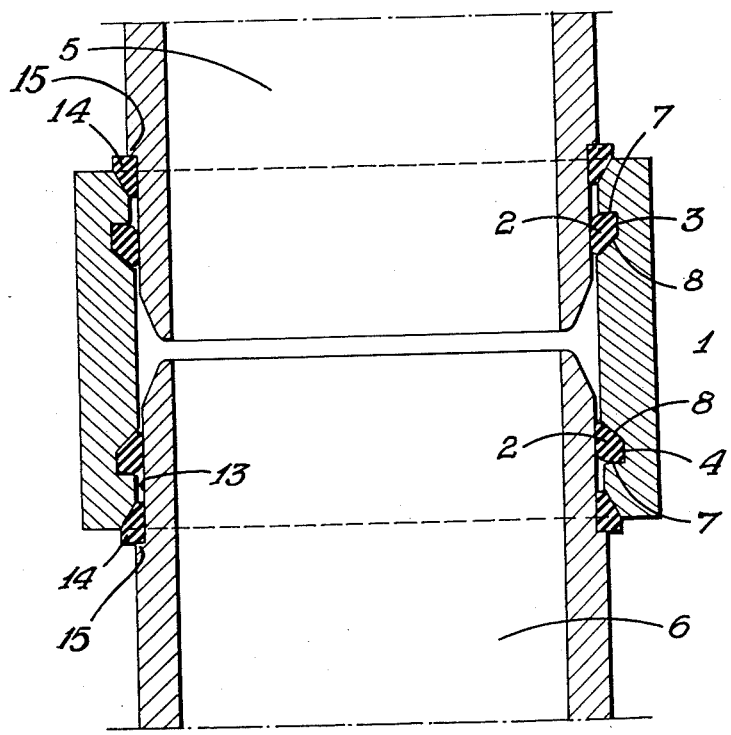
Figure 2:
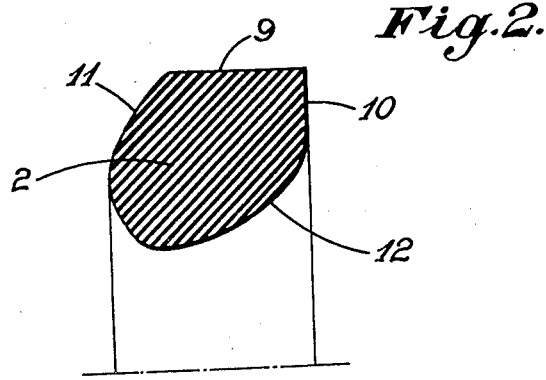

One embodiment of the invention is illustrated by way of example in the accompanying drawings wherein:
FIG. 1 is a longitudinal sectional view of an assembled coupling, and
FIG. 2 is a cross-section through a ring which is not compressed.

The coupling illustrated in the drawing is formed of a sleeve 1 within which elastic rings 2 are lodged in grooves 3 and 4. The ends of pipes 5 and 6 are engaged in the sleeve and compress the rings with which they form a sealing-tight joint. The grooves 3 and 4 have a cylindrical bottom, an outer side 7 perpendicular to the axis of the sleeve and an inner side 8 inclined towards the middle of the sleeve. The rings 2, shaped so as to fit the shape of the grooves, have plane faces 9 and 10 which meet one another at a right angle, a face 11 which bears against the inclined side of the groove, and a curved face 12 constituting the rounded-off portion which facilitates the entry of the pipes into the sleeve. For the same purpose, the ends of the pipes are bevelled externally. When these ends are engaged in the sleeve, the rings are compressed between them and the sleeve and constitute packings whose tightness increases with the pressure of the fluid passing through the conduit, since under the effect of this pressure the rings retained in the groove by the sides 7 are pressed against the pipes.

The arrangement described makes it possible to provide relatively considerable clearance between the inner diameter of the sleeve and the outer diameter of the pipes, and the latter can be offset axially by several degrees relatively to one another without impairing the perfect sealing-tightness of the packings.

Although it is not indispensible, the ends of the pipes are advantageously reduced in diameter at the portion 13 which engages in the sleeve, and elastic rings 14 used as abutments for the sleeve are then slid over these reduced diameter portions and bear against the steps 15. They are preferably bevelled similarly to the sleeve. These abutments key the sleeves on the pipes and prevent the ends of the pipes from touching one another inside the sleeve.

The sleeves and the ends of the pipes which engage therein are preferably machined so as to be perfectly round. The sleeves can be ordinary sections of smooth piping, machined internally to form therein the grooves 3 and 4 and the end bevelled portions.

Of course the invention is not limited to the form of embodiment which has been described and illustrated by way of example.

What is claimed is:

A pipe arrangement comprising smooth pipes in axially aligned end-to-end relation, a sleeve encircling the opposed ends of the pipes, said sleeve being provided with a groove adjacent each of the ends of the pipes, each of the grooves having a cylindrical bottom, a truncated conical side proximate the end of the corresponding pipe and a radial side, said sides bounding the cylindrical bottom, said conical side and said radial side being convergent in a radially outwards direction, a solid elastic packing ring supported in each of said grooves, each said ring having three sides corresponding respectively to said bottom and said sides of the associated groove, each said ring having a fourth side of ellipsoidal cross section projecting inwardly of the sleeve in inclined relation with the axis of the pipes with the ring supported in an associated groove and with the sides of the ring and the groove in corresponding relation, said fourth side normally defining an opening in the ring thereof which is smaller in size than the diameter of the pipes such that with said pipes inserted in the openings of the rings the fourth sides thereof are deformed while said rings remain supported in said grooves whereby a sealing relationship is provided between said pipes and said sleeve, said sleeve having ends facing said pipes which ends are of bevel shape, each said pipe including a shoulder adjacent a corresponding bevel end of said sleeve, and an elastic ring for each of said pipes, each elastic ring having one side corresponding to and engaged against the associated bevel end of the sleeve and another side opposite the first said side of the elastic ring and engaged against the shoulder of the associated pipe.

References Cited in the file of this patent
UNITED STATES PATENTS

| 1,671,789 | Smith | May 29, 1928 |
|---|---|---|
| 2,477,533 | Whiting | July 26, 1949 |
| 2,738,992 | Heisler | Mar. 20, 1956 |
| 2,871,031 | Altemus | Jan. 27, 1959 |
| 2,887,328 | Risley et al. | May 19, 1959 |

FOREIGN PATENTS

| 464,087 | Great Britain | Apr. 12, 1937 |
|---|---|---|
| 1,126,692 | France | July 30, 1956 |